United States Patent
Abuelsaad et al.

(10) Patent No.: US 10,509,627 B2
(45) Date of Patent: *Dec. 17, 2019

(54) USER INTERFACE SOUND EMANATION ACTIVITY CLASSIFICATION

(71) Applicant: International Business Machines Corporation, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/820,823

(22) Filed: Nov. 22, 2017

(65) Prior Publication Data

US 2019/0018647 A1      Jan. 17, 2019

Related U.S. Application Data

(63) Continuation of application No. 15/648,628, filed on Jul. 13, 2017.

(51) Int. Cl.
    *G06F 3/16*     (2006.01)
    *G06N 20/00*    (2019.01)
    (Continued)

(52) U.S. Cl.
    CPC .............. *G06F 3/167* (2013.01); *G06F 9/451* (2018.02); *G06K 9/00* (2013.01); *G06N 5/047* (2013.01);
    (Continued)

(58) Field of Classification Search
    CPC ........... G06F 3/167; G06F 9/451; G06F 8/61; G06K 9/00; G10L 25/51; G06N 20/00; G06N 5/047
    See application file for complete search history.

(56) References Cited

U.S. PATENT DOCUMENTS 5,031,113 A * 7/1991 Hollerbauer .............. G06F 3/16
                                                    704/235
5,164,900 A * 11/1992 Bernath .................. G06F 3/018
                                                    704/200

(Continued)

FOREIGN PATENT DOCUMENTS

| CN | 105529038 A | 4/2016 |
|---|---|---|
| WO | WO2012038775 | 3/2012 |
| WO | WO2019012395 | 1/2019 |

OTHER PUBLICATIONS

A.Kelly, "*Cracking Passwords Using Keyboard Acoustics and Language Modeling*," University of Edinburgh, http://citeseerx.ist.psu.edu/viewdoc/download?doi=10.1.1.186.2078&rep=rep1&type=pdf, p. 54,(2010).

(Continued)

*Primary Examiner* — Kieu D Vu
*Assistant Examiner* — Alvaro R Calderon, IV
(74) *Attorney, Agent, or Firm* — Robert J. Shatto, Esq.; George S. Blasiak, Esq.; Heslin Rothenberg Farley & Mesiti, PC

(57) ABSTRACT

Methods, computer program products, and systems are presented. The method computer program products, and systems can include, for instance: obtaining an audio input, the audio input representing sound emanating from a key press based user interface; generating a context pattern based on the audio input; performing classification of the context pattern to classify the context pattern as belonging to a signature pattern classification, wherein the signature (Continued)

pattern classification specifies a user activity; and providing an output based on the performing classification.

13 Claims, 8 Drawing Sheets

(51) Int. Cl.
| | | |
|---|---|---|
| *G06N 5/04* | (2006.01) | |
| *G10L 25/51* | (2013.01) | |
| *G06F 9/451* | (2018.01) | |
| *G06K 9/00* | (2006.01) | |
| *G06F 8/61* | (2018.01) | |

(52) U.S. Cl.
CPC .............. *G06N 20/00* (2019.01); *G10L 25/51* (2013.01); *G06F 8/61* (2013.01)

(56) References Cited

U.S. PATENT DOCUMENTS

| | | | | |
|---|---|---|---|---|
| 5,715,469 | A * | 2/1998 | Arning | G06F 17/273 434/169 |
| 6,525,717 | B1* | 2/2003 | Tang | G06F 3/0202 178/18.04 |
| 7,352,358 | B2* | 4/2008 | Zalewski | A63F 13/10 345/156 |
| 7,813,822 | B1* | 10/2010 | Hoffberg | G06K 9/00369 381/73.1 |
| 7,844,666 | B2* | 11/2010 | Horvitz | G06Q 10/107 709/206 |
| 8,938,394 | B1* | 1/2015 | Faaborg | G06F 3/167 704/270 |
| 9,026,927 | B2* | 5/2015 | Brumback | A61B 5/0015 715/764 |
| 9,275,347 | B1* | 3/2016 | Harada | G06F 16/285 |
| 9,471,873 | B1* | 10/2016 | Wu | G06N 5/04 |
| 10,048,935 | B2* | 8/2018 | Lenchner | G06F 3/167 |
| 10,048,936 | B2* | 8/2018 | Maker, III | G06F 3/167 |
| 2001/0014600 | A1* | 8/2001 | Osman | H04M 1/656 455/412.1 |
| 2002/0135618 | A1* | 9/2002 | Maes | G06F 3/0481 715/767 |
| 2002/0161759 | A1* | 10/2002 | Dieberger | G06F 3/167 |
| 2003/0132950 | A1* | 7/2003 | Surucu | G06F 1/1626 715/700 |
| 2003/0197687 | A1* | 10/2003 | Shetter | G06F 3/04886 345/173 |
| 2004/0049388 | A1* | 3/2004 | Roth | G10L 15/19 704/251 |
| 2004/0249650 | A1* | 12/2004 | Freedman | G06Q 30/02 705/7.29 |
| 2005/0043947 | A1* | 2/2005 | Roth | G10L 15/19 704/236 |
| 2005/0185773 | A1* | 8/2005 | Burger | H04M 7/006 379/88.22 |
| 2006/0139328 | A1* | 6/2006 | Maki | G06F 1/1616 345/161 |
| 2008/0114710 | A1* | 5/2008 | Pucher | G06N 20/00 706/20 |
| 2011/0098056 | A1* | 4/2011 | Rhoads | G01C 21/20 455/456.1 |
| 2011/0161076 | A1* | 6/2011 | Davis | G06F 3/04842 704/231 |
| 2013/0070928 | A1* | 3/2013 | Ellis | H04R 25/30 381/56 |
| 2015/0109216 | A1* | 4/2015 | Oh | G06F 3/041 345/173 |
| 2015/0131850 | A1 | 5/2015 | Qvarfordt | |
| 2015/0161999 | A1* | 6/2015 | Kalluri | G10L 15/22 704/257 |
| 2015/0348548 | A1* | 12/2015 | Piernot | G10L 15/22 704/235 |
| 2016/0049915 | A1* | 2/2016 | Wang | H03G 3/3089 381/107 |
| 2016/0070702 | A1* | 3/2016 | Mao | G06F 16/48 715/716 |
| 2016/0162067 | A1* | 6/2016 | Wu | G06F 3/043 345/177 |
| 2016/0180853 | A1* | 6/2016 | VanLund | G10L 17/22 704/275 |
| 2016/0328667 | A1* | 11/2016 | Macciola | G06Q 10/0633 |
| 2016/0379105 | A1* | 12/2016 | Moore, Jr. | G06F 3/167 706/11 |
| 2017/0024100 | A1* | 1/2017 | Pieper | G06F 3/0486 |
| 2017/0032778 | A1* | 2/2017 | Kim | G10L 15/02 |
| 2017/0125034 | A1* | 5/2017 | Kakadiaris | G06F 3/165 |
| 2017/0154314 | A1* | 6/2017 | Mones | G06Q 10/1053 |
| 2018/0293510 | A1* | 10/2018 | Beigi | G06F 16/61 |
| 2018/0358005 | A1* | 12/2018 | Tomar | G06F 17/2785 |
| 2018/0364907 | A1* | 12/2018 | Shikhare | G06F 3/0231 |
| 2018/0373357 | A1* | 12/2018 | Wu | G06F 3/043 |
| 2019/0018646 | A1 | 1/2019 | Abuelsaad | |

OTHER PUBLICATIONS

Y. Berger, et al., "*Dictionary Attacks Using Keyboard Acoustic Emanations,*" ACM Digital Library, Israel, https://www.eng.tau.ac.il/~yash/p245-berger.pdf, p. 10, (2006).

G. Neale, et al., "*Investigating the Feasibility of Keyboard Acoustic Attacks,*" Department of Computer Science—University of Auckland, https://www.cs.auckland.ac.nz/courses/compsci725s2c/archive/termpapers/gneale.pdf, p. 12, (2006).

L. Zhuang, et al., "*Keyboard Acoustic Emanations Revisited,*" ACM Digital Library, pp. 373-382, Nov. 2005.

C. Biever, "*Keyboard Sounds Reveal Their Words,*" Daily News, Sep. 14, 2005.

Notification of Transmittal of the International Search Report and the Written Opinion of the International Searching Authority for International Patent Application No. PCT/IB2018/055002 filed Jul. 6, 2018, dated Nov. 14, 2018.

International Search Report for International Patent Application No. PCT/IB2018/055002 filed Jul. 6, 2018, dated Nov. 14, 2018.

Written Opinion for International Patent Application No. PCT/IB2018/055002 filed Jul. 6, 2018, dated Nov. 14, 2018.

Non-Final Rejection for U.S. Appl. No. 15/648,628, filed Jul. 13, 2017, dated Mar. 19, 2019.

Applicant's Response to Non-Final Rejection for U.S. Appl. No. 15/648,628, filed Jul. 13, 2017, dated Mar. 29, 2019.

T. Abuelsaad, et al., "User Interface Sound Emanation Activity Classification" U.S. Appl. No. 15/648,628, filed Jul. 13, 2017.

List of IBM Patent and/or Patent Applications treated as related for U.S. Appl. No. 15/820,823, filed Nov. 22, 2017, dated Nov. 22, 2017.

Global Dossier Report, U.S. Appl. No. 15/820,823, filed Nov. 22, 2018, dated Aug. 8, 2019.

Notice of Allowance, U.S. Appl. No. 15/648,628, filed, Jul. 13, 2017, dated Jul. 30, 2019.

Non-Final Office action, U.S. Appl. No. 15/648,628, filed, Jul. 13, 2017, dated Mar. 19, 2019.

Applicant's Response to Non-Final Office action, U.S. Appl. No. 15/648,628, filed, Jul. 13, 2017, dated Mar. 29, 2019.

* cited by examiner

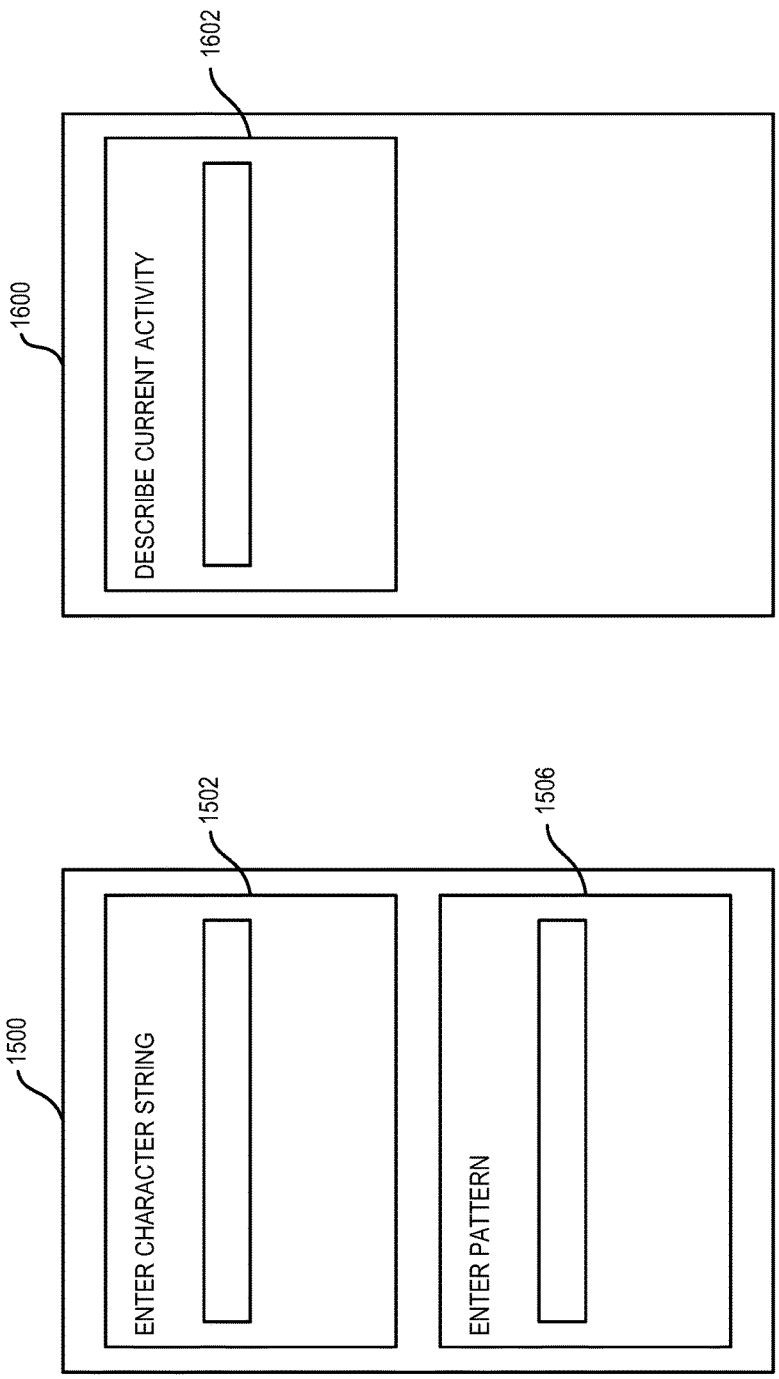

USER INTERFACE SOUND EMANATION ACTIVITY CLASSIFICATION

CROSS-REFERENCE TO RELATED APPLICATION

This application is a continuation of U.S. patent application Ser. No. 15/648,628, filed Jul. 13, 2017, entitled, "User Interface Sound Emanation Activity Classification," the entirety of which is hereby incorporated herein by reference.

BACKGROUND

The present disclosure relates to computer devices and particularly to discriminating activity of a computer device user.

Acoustic emanations from computer keyboards have been investigated in the context of computer security threats. It has been recognized that the sound of clicks may differ slightly from key to key although clicks of different keys sound similar to the human ear. Acoustic emanations form a PC keyboard have been investigated, and experiments have shown that processing can be performed to differentiate between key presses of a keyboard. Further it has been shown that typing styles have little impact on a trained neural network's capacity to recognize key presses.

SUMMARY

Shortcomings of the prior art are overcome, and additional advantages are provided, through the provision, in one aspect, of a method. The method can include, for example: obtaining an audio input, the audio input representing sound emanating from a key press based user interface; generating a context pattern based on the audio input; performing classification of the context pattern to classify the context pattern as belonging to a signature pattern classification, wherein the signature pattern classification specifies a user activity; and providing an output based on the performing classification.

In another aspect, a computer program product can be provided. The computer program product can include a computer readable storage medium readable by one or more processing unit and storing instructions for execution by one or more processor for performing a method. The method can include, for example: obtaining an audio input, the audio input representing sound emanating from a key press based user interface; generating a context pattern based on the audio input; performing classification of the context pattern to classify the context pattern as belonging to a signature pattern classification, wherein the signature pattern classification specifies a user activity; and providing an output based on the performing classification.

In a further aspect, a system can be provided. The system can include, for example, a memory. In addition, the system can include one or more processor in communication with the memory. Further, the system can include program instructions executable by the one or more processor via the memory to perform a method. The method can include, for example: obtaining an audio input, the audio input representing sound emanating from a key press based user interface; generating a context pattern based on the audio input; performing classification of the context pattern to classify the context pattern as belonging to a signature pattern classification, wherein the signature pattern classification specifies a user activity; and providing an output based on the performing classification.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts an administrator user interface that can be displayed on a display of an administrator user computer device;

FIG. 6 depicts a user interface that can be disposed on a user computer device;

DETAILED DESCRIPTION

Figure 1:
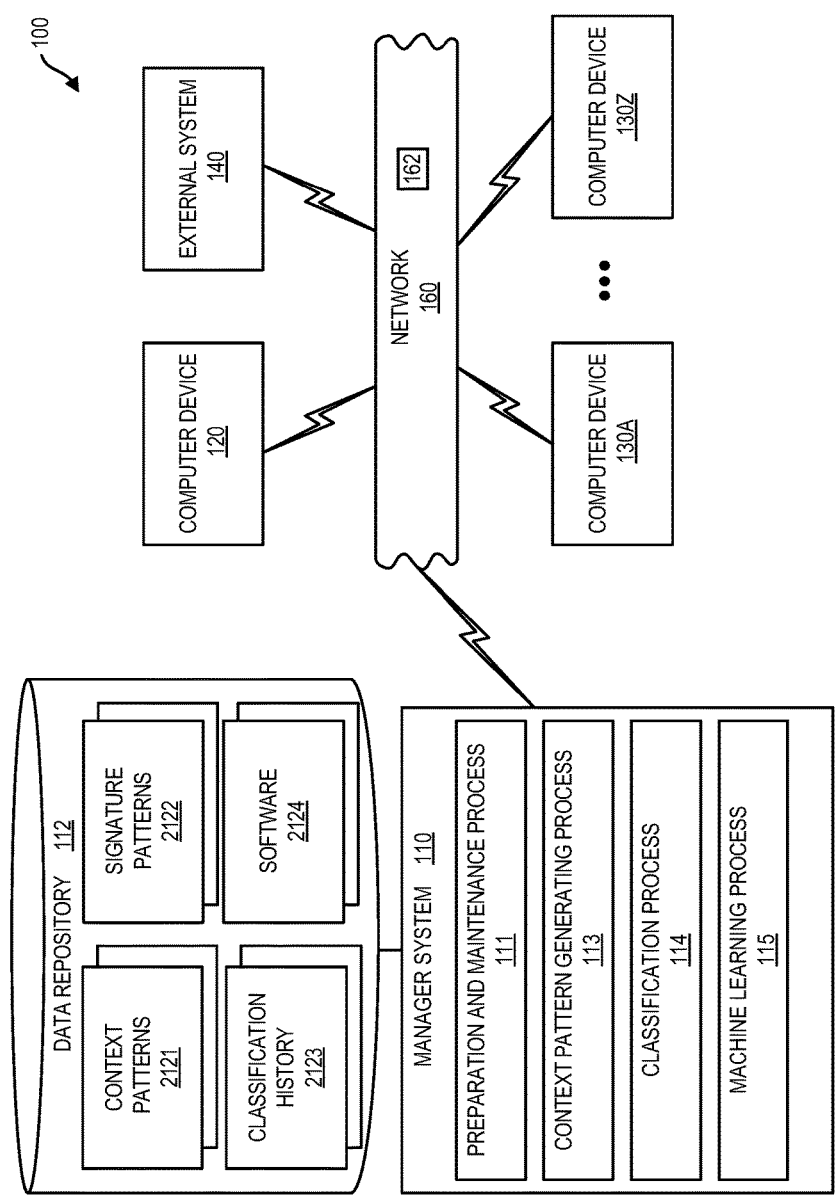
FIG. 1 depicts a system having manager system and one or more computer device.

FIG. 1 is a block diagram of a system 100, in accordance with an embodiment as set forth herein. In the embodiment of FIG. 1, system 100 can include numerous devices, such as computer node based devices connected by a network 160. For example, network 160 may be a physical network or a virtual network. A physical network can be, for example a physical telecommunications network connecting numerous computer nodes or systems, such as may be provided by computer servers and computer clients. By contrast a virtual network can, for example, combine numerous physical networks or parts thereof into a logical virtual network. In another example, numerous virtual networks can be defined over a single physical network.

By way of explanation, FIG. 1 depicts an example environment. In one embodiment, system 100 can include a manager system 110, having an associated data repository 112, one or more administrator user computer device 120 and user computer devices 130A-130Z. Manager system 110 and computer devices 130A-130Z can be in communication via network 160. Regarding computer devices 130A-130Z, computer devices 130A-130Z can be operative to generate audio information representing sound emanating from a computer key press based user interface, e.g. including a keyboard and/or a pointer controller. Accordingly, a representative computer device of computer devices 130A-130Z can include an audio input device e.g. a microphone. A certain audio input device of computer devices 130A-130Z, e.g. computer device 130A can provide an audio input representing sounds emanating from a key press based user interface of computer device 130A and/or an audio input representing sounds of a key press based user interface computer device other than computer device 130A such as a computer device in proximity with computer device 130A. In one embodiment, manager system 110 can be external to each device or system of system 100. In one embodiment, manager system 110 can be co-located with one or more other device or system of system 100.

Embodiments herein provide for monitoring of one or more computer key press based user interface and for recording key press sounds e.g. click sounds in order to interpolate what type of activity the user is engaged in. A "computer key based interface" as set forth herein refers broadly to user interface apparatus having keys, e.g. computer keyboards and/or pointer controller e.g. mouse devices for navigating a graphical user interface. Key presses herein refer to computer keyboard key presses as well as pointer controller clicks such as "mouse clicks." Computer key presses can include e.g. alphabet character key presses, numerical character key presses, symbol character key presses e.g. arrow key and/or space bar key presses. Embodiments herein can provide a cognitive service that will take as inputs keyboard key press sounds and produce as an output a cognitive analysis of specific people that may be typing or an anonymous analysis of the types of activities that person is engaged in. Some of the general classifications that can be provided include e.g. Web Browsing, Social Media, Mass Messaging, Gaming, Word Processing, and Specific String.

System 100 in one embodiment can be provided to determine what types of activities a user (or collection of users) are engaged in by only listening to the sounds generated by their key press based user interfaced including keyboards. System 100 can be provide to determine what general types of activities a crowd is doing without requiring access to and without exposing personal identities.

Manager system 110 can run various processes, such as preparation and maintenance process 111, context pattern generating process 113, classification process 114, and machine learning process 115. Preparation and maintenance process 111 can prepare and maintain data within data repository 112 for use by other processes run by manager system 110, e.g. context pattern generating process 113, classification process 114, and machine learning process 115. Data stored in data repository 112 by running of preparation and maintenance process 111 can include various data. For example, in context patterns area 2121 data repository 112 can store records of context patterns and in signature patterns area 2122, data repository 112 can store records of signature context patterns. In classification history area 2123, data repository 112 can store records of pattern classifications performed by manager system 110. In software area 2124, data repository 112 can store various software modules, e.g. for modification of functioning of one or more computer device or system of system 100.

Records of context patterns stored in context pattern area 2121 can represent audio inputs received at various times from computer devices 130A-130Z. Such records can include e.g. identifiers that identify serial number for each context pattern, the particular computer device producing a particular audio input, and time stamp information indicating e.g. a start time, a stop time, and a time duration for each audio input. Records in areas 2122-2124 can also include identifier and timestamp information.

Manager system 110 can run context pattern generating process 113 to generate context patterns based on received audio inputs received from computer devices 130A-130Z. In one example, each computer device e.g. computer device 130A of computer devices 130A-130Z can provide an audio input, e.g. in the form of an audio signal and such audio signal can be received by manager system 110. Computer devices 130A-130Z can be computer devices having respective audio input devices, and can be provided by such types of devices as PCs, laptops, tablets, mobile phones, dedicated processor based microphones, camcorders or any combination of such devices.

Running context pattern generating process 113, manager system 110 can determine a context pattern based on the received and processed audio input. A context pattern can include e.g. character string information and timing information. Manager system 110 running classification process 114 can classify a context pattern determined using context pattern generating process 113. Running classification process 114, manager system 110 can classify a determined context pattern as belonging to a signature context pattern classification. Example signature pattern classifications include, e.g. a Web Browsing signature pattern classification, a Social Media signature pattern classification, a Mass Messaging signature pattern classification, a Gaming signature pattern classification, a Word Processing signature pattern classification, and a Specific String signature pattern classification.

In one embodiment, manager system 110 can run machine learning process 115. Machine learning process 115 can run various background processes such as storing records of context patterns and classifications in data repository 112 for later trends analysis use. Manager system 110 can be configured so that a certain process of machine learning process 115 is activated responsively to a failure by classification process 114 to classify a context pattern. For example, manager system 110, in one embodiment based on classification process 114 failing to successfully classify a current context pattern can run a certain process of machine learning process 115 resulting in manager system 110 registering the current determined unclassifiable context pattern as a new signature pattern stored in signature patterns area 2122 of data repository 112. Based on a classification failure of a current context pattern in one embodiment manager system 110 can activate a displayed user interface of the certain computer e.g. computer device 130A that has triggered generation of the current context pattern. The displayed user interface can prompt input of information from the user of computer device 130A as to the activity being performed by computer device 130A. Manager system 110 can responsively store the current context pattern into signature patterns area 2122 labeling with pattern with the returned information that specifies the activity associated to the current context pattern. Manager system 110 can thus be trained to classify an incoming context pattern as belonging to the signature pattern classification of the just stored signature pattern.

Figure 2:
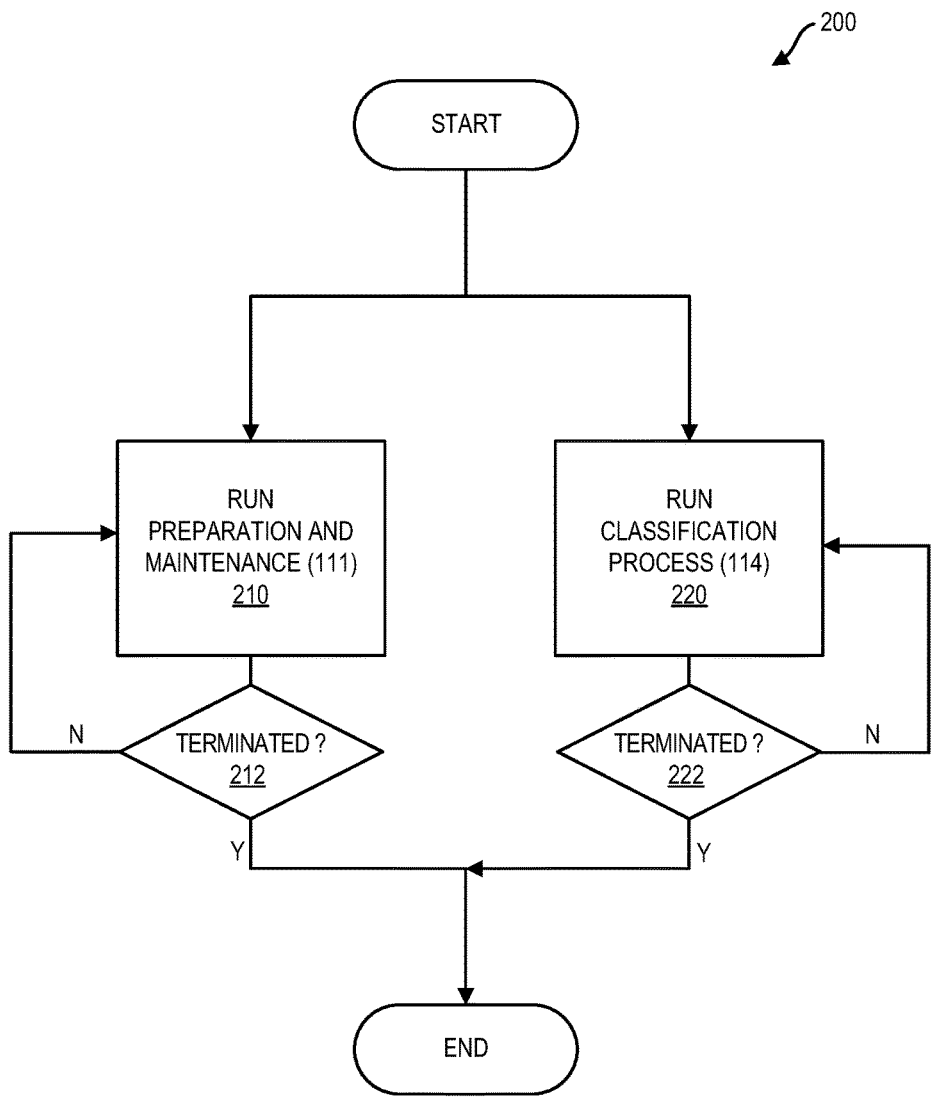
FIG. 2 is a flowchart illustrating a coordination method for performance by a manager system according to one embodiment.

FIG. 2 is a flowchart illustrating a method 200 that can be performed by manager system 110. At block 210, manager system 110 can run preparation and maintenance process 111 e.g. to populate, prepare, and/or maintain various data of data repository 112 including data of context patterns area 2121, signature patterns area 2122, classification history area 2123 and software area 2124. Manager system 110 can run preparation and maintenance process 111 until process 111 is terminated at block 212. At block 220, manager system 110 can run classification process 114 to classify incoming context patterns generated from audio inputs as belonging to signature pattern classifications. Manager system 110 can run classification process 114 until classification process 114 is terminated at block 222. For running of classification process 114, context pattern generating process 113 can be iteratively run.

For performance of preparation and maintenance process 111, manager system 110 can be configured to automatically process audio inputs received from computer devices 130A-130Z. For performance of preparation and maintenance process 111, manager system 110 can be configured to automatically receive data from one or more external system 140 e.g. for enhancement of an inventory of software modules within software area 2124. Manager system 110 can run Natural Language Processing (NLP) processes for the performing of preparation and maintenance process 111.

Embodiments herein recognize that key presses can be determined from recorded sounds emanating from a computer key press based user interface. The key presses determined can include specific keys pressed. Embodiments herein recognize that recordings of computer key press based user interface sound clicks can be converted into a string of characters and/or words. Embodiments herein recognize that specific sounds can be mapped to particular keys including by use of various processes which can include e.g. machine learning processing including e.g. neural network processing. Determinations of key presses can employ spelling and grammar analysis to resolve key presses determined with low confidence levels.

Embodiments herein recognize that a key press classifier can be trained in a training stage and used to recognize key presses in recognition stage. A key press classifier can employ machine learning algorithms that are neural network based or non-neural network based. Training of a key press classifier in one embodiment, can include e.g. feature extraction, supervised or unsupervised key recognition, spelling and grammar checking, and feedback based training. Feature extraction can include, e.g. Cepstrum feature extraction and/or FFT feature extraction. Key recognition, in one embodiment can include unlabeled training data. For example, key strokes can be clustered into one of N classes using clustering methods, N can be chosen to be higher, larger than the number of keys on a keyboard. Conditional distribution classes can be determined using clustering and Hidden Markov Models (HMM), can be used for providing enhanced predictions. Key distributions and key to class mapping distributions can be estimated using HMM algorithms. Dictionary based spelling correction can be used together with grammar correction processing. Spelling and grammar correction can be combined in a Hidden Markov Model for increased accuracy. Feedback based training processes can be used to reduce or eliminate reliance on spellcheck or grammar check processes. In one embodiment, previously obtained corrected results can be labeled as training samples and heuristics can be used to select words that are more likely to be correct. Various classification algorithms can be used, e.g. linear classification algorithms and/or Gaussian based classification algorithms.

Figure 3:
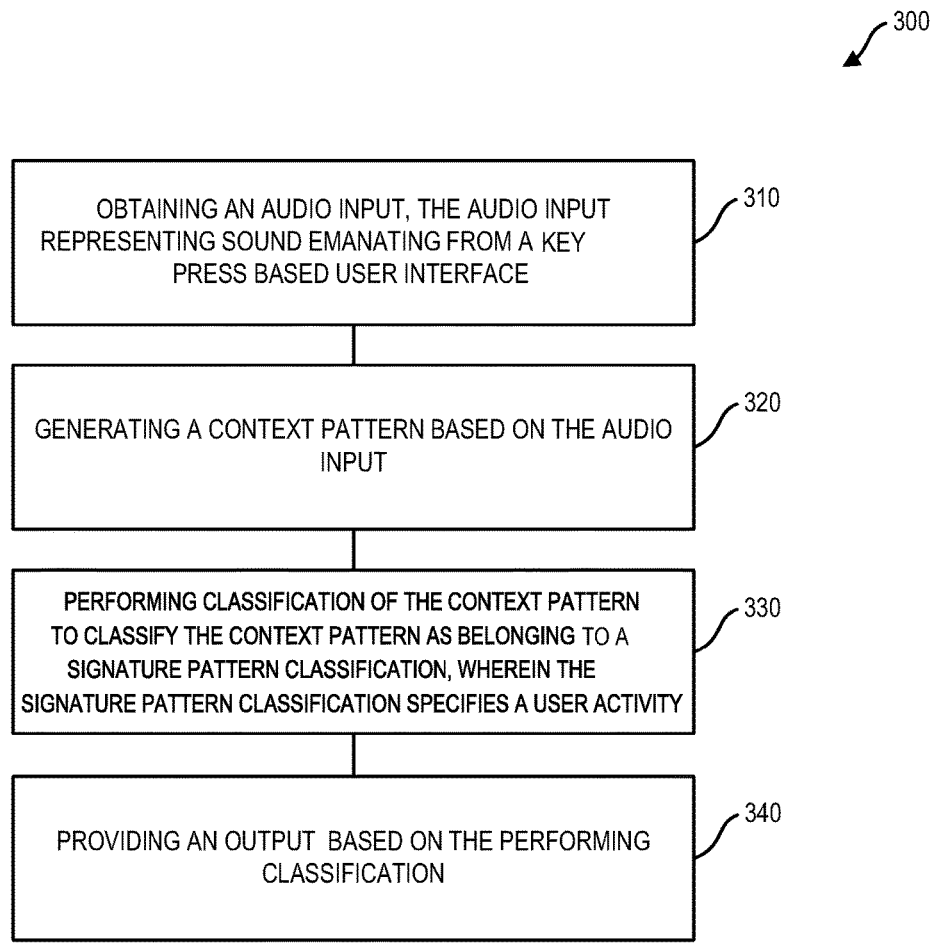
FIG. 3 is a flowchart illustrating a method for performance by a manager system according to one embodiment.

FIG. 3 is a flowchart depicting a method 300 that can be performed by manager system 110 in one embodiment. At block 310 manager system 110 can perform obtaining an audio input, the audio input representing sound emanating from a key press based user interface. At block 310 manager system 110 can perform generating a context pattern based on the audio input. Method 300 can include manager system 110 at block 330 performing classification of the context pattern for classifying the context pattern as belonging to a signature pattern classification. At block 340 manager system 110 can perform providing an output based on the performing classification.

System 100 can be operative to monitor one or more computer key press based user interface and record key press based user interface including keyboard sounds in order to interpolate what type of activity the user or group of users are engaged in. These key press based user interface acoustics become "the language of the user interface" and define a new input to a new cognitive interface. System 100 can provide a cognitive service that can take as inputs key press based user interface sounds (e.g.—a new type of language) and produce as an output a cognitive analysis of specific people that may be typing or an anonymous analysis of the types of activities that person is engaged in. Some of the general categories that could be derived include (web browsing, using a social media website, gaming, word processing etc.). System 100 can provide one to thousands to millions to billions of acoustic input listening devices e.g. mobile phone to listen for key press based user interface specific sound patterns. Sound patterns can be listened for by generating a context patterns based on an acoustic inputs and classifying generated context patterns as belonging to a signature pattern classification. System 100 can analyze timing information of an audio input. For monitoring timing information manager system 110 can generate a context pattern that includes data representing pause duration between key presses. System 100 can e.g. monitor how many keys are entered before a pause, can combine multiple words into a phrase and then looking for that phrase.

System 100 can analyze key press based user interface sounds and can translate that sound into context pattern data to determine user activity. System 100 can identify activity context using key press based user interface acoustic patterns (e.g. The user activity classifications Web Browsing, Social Media, Mass Messaging, Gaming, Word Processing, Specific String, etc.). Each of the user activity classification can have an associated one or more signature patterns stored in signature patterns area 2122 of data repository 112. Each different signature pattern classification can specify a different user activity, e.g. Web Browsing, Social Media, Mass Messaging, Gaming, Word Processing, and/or Specific String. Manager system 110 can identify words or phrases being entered through an analysis of computer key press based user interface acoustic patterns from which context patterns can be generated.

Figure 4:
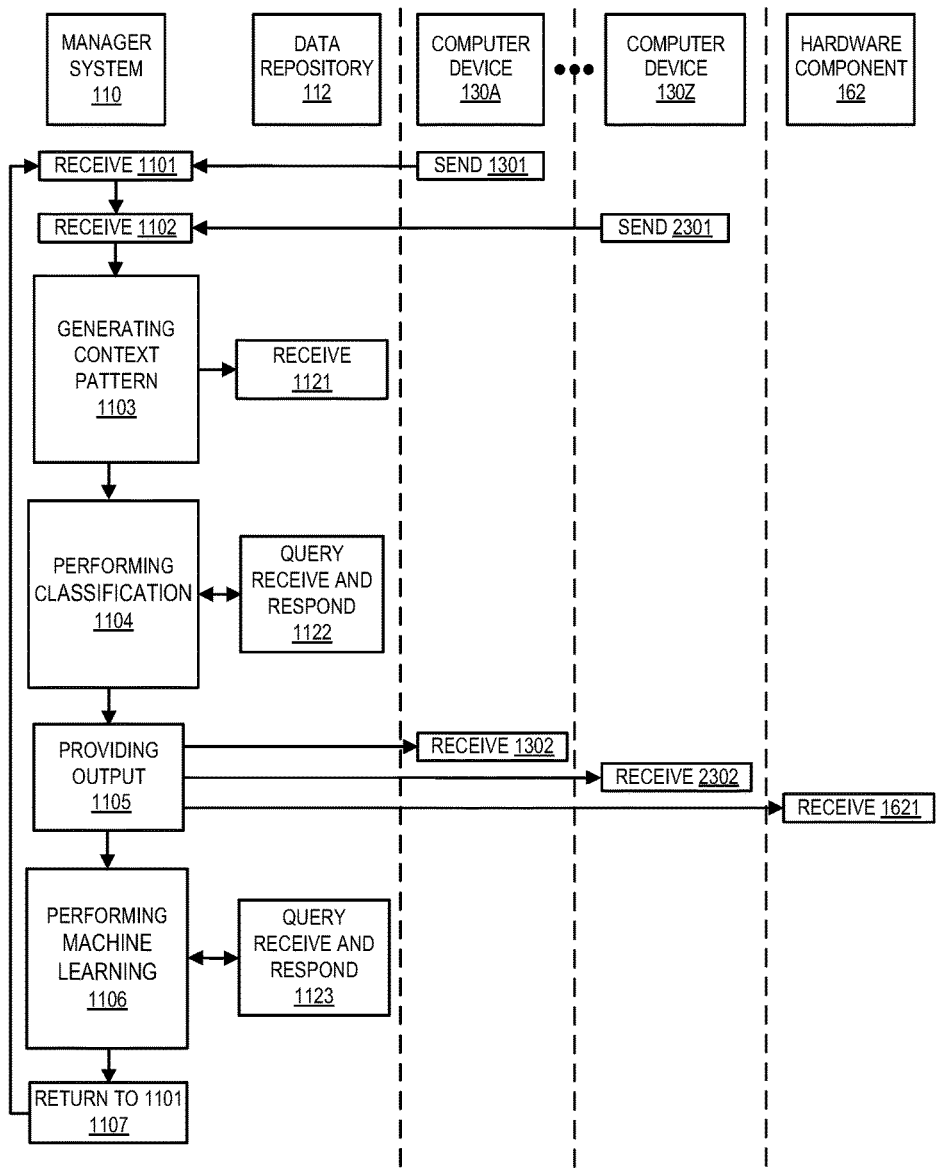
FIG. 4 is a flowchart illustrating a method for performance by a system having a manager system according to one embodiment.

FIG. 4 is a flowchart illustrating an example of method 300 performed with use of system 100, from the perspective of manager system 110 and its associated data repository 112, computer devices 130A-130Z, and hardware component 162 of network 160.

At blocks 1301 and 2301, computer device 130A and computer device 130Z, respectively, can send audio inputs for receipt by manager system 110 at block 1101 and block 1102, respectively.

It should be noted that computer device 130A and computer device 130Z can be differently configured. In one embodiment, for example, the certain computer device 130A can be configured so that at block 1301 an audio input representing sounds of key presses sent by computer device 130A is an audio input representing sound of key presses emanating from a key press based user interface of the computer device 130A, e.g., including one or more or a computer keyboard or pointer controller e.g. mouse of the certain computer device 130A. Computer device 130Z, on the other hand, in one embodiment, can be configured as a computer device that sends an audio input representing sounds emanating from a key press based user interface of a computer device external to computer device 130Z.

On receipt of data at blocks 1101 and 1102, manager system 110 can proceed to block 1103 to run context pattern generating process 113. At block 1103, manager system 110 can generate a context pattern based on one or more of the received audio inputs received at block 1101 or block 1102.

For performance of such generating, manager system 110 can output a context pattern having a certain format. There can be multiple alternative valid formats, or in one embodiment a single valid format. According to one embodiment, a certain format for a generated context pattern can include a sequence of key presses. A sequence of key presses can include, e.g. string of text characters, e.g. letter, number, and/or symbol characters and/or additional key presses (e.g. pointer device clicking, space bar presses, etc.). In one embodiment, a context pattern can include a sequence of key processes (specific or generic) and timing information e.g. timing information that specifies timing information of a set of pauses between the key presses. Embodiments herein recognize that substantial identifying information can be included by pauses in between key presses. For example, single handed key presses ("E", "R", on a QWERTY keyboard) generally ensure longer duration than two handed key presses ("E", "P") and embodiments herein recognize that timing information can be used in determining a sequence of key presses. Further, timing information can be retained after it is used to derive key sequences and can be included as part of a context pattern that includes key press sequences and timing information.

A context pattern that includes specific key presses can include a sequence of key presses including a certain character string and timing information in the form of time periods representing pauses between key presses. Manager system 110 can base classifications on key press sequences (e.g. including character strings) and/or timing information and in one embodiment can use timing information to resolve conflicts between prospective classifications determined by manager system 110. For each pattern generated at block 1103, manager system 110 can store a generated context pattern into data repository 112 for receipt by data repository 112 at receive block 1121. On completion of generating one or more context patterns, manager system 110 at block 1104 can run classification process 114 (FIG. 1). For performing classification of a context pattern as belonging to a signature pattern classification manager system 110 can compare a current context pattern to stored signature patterns stored in data repository 112 and can perform matching between a current context pattern and a stored signature pattern. For performing matching manager system 110 can employ one or more pattern recognition process, e.g. employing classification algorithms and/or clustering algorithms and/or schemes involving calculation of similarity or dissimilarity values.

Based on the matching manager system 110 at block 1104 can perform classification of the one or more context pattern generated at block 1103 for classifying the context pattern as belonging to a signature pattern classification. For performing such matching based classifying at block 1104, manager system 110 can make multiple queries for receipt by data repository 112, as indicated by query receive and respond block 1122 (FIG. 4), performed by data repository 112.

Manager system 110 at block 1104 in one embodiment can perform various alternative classifications as are set forth herein. For each candidate signature pattern classification, data repository 112 can store one or more signature pattern. Manager system 110 can classify a current context pattern as belonging to a certain signature pattern classification based on it matching one or more signature pattern associated to the signature pattern classification. Signature patterns stored in data repository 112 can e.g. be defined by lists of patterns and/or expressed with functions including mathematical and/or logical operators. For performing matching in one embodiment matching can be based on a matching criteria that does not require an exact matching. Matching can be based on a best fit criteria in one embodiment and in one embodiment can include similarity and dissimilarity evaluations.

Manager system 110 using context pattern generation and classification processing can analyze key press based user interface sounds including keyboard sounds and can identify patterns e.g. including the following: Web Browsing context: "www."+".com"+page down and page up and scrolling patterns, Mass Messaging context: <M characters followed by an "Enter" key; Social Media context: "[specific domain].com" or "click"+short response+"enter" OR several click patterns; Gaming context: up down left and/or right arrow key usage; Word Processing context characterized by large amounts of typing without changing windows. Manager system 110 can analyze key press based user interface sounds and can look for patterns that will indicate a certain type of activity. Certain types of activities have attributes that are commonly repeated. For example while browsing the web it can be observed that the keys "www." followed by on average 2-8 characters followed by a ".com" is a commonly observed pattern. If manager system 110 identifies such a pattern in combination with other keyboard sounds like hitting the page down button periodically (indicating reading a web page) manager system 110 may then properly associate that user's activity context as "Web Browsing". Manager system 110 can classify a context pattern as belonging to a signature pattern classification. Each different signature pattern classification can specify a different user activity. Exemplary signature pattern classifications, which can alternatively be termed user activity classifications, are summarized in Table A.

TABLE A

| Signature Pattern Classification | Description of Signature Patterns of the Signature Pattern Classification |
|---|---|
| Web Browsing | Characterized by the character string "www." and ".com" and/or page up/page down scrolling patterns. Characterized by long pauses (e.g. greater than a threshold duration) between key presses. NOTE: There can be multiple "Web Browsing" sub-classifications, e.g. one for each of several specified domains. |
| Social Media | Characterized by "click" and "enter" or several click patterns and/or [specificdomain].com. NOTE: There can be multiple "Social Media" sub-classifications, e.g. one each for FACEBOOK ® or LINKEDIN ®. (Facebook is a registered trademark of Facebook, Inc.). (LINKEDIN ® (LinkedIn is a registered trademark of LinkedIn Corporation), |
| Mass Messaging | Characterized by <N (e.g. N = 140) characters followed by and "enter" key stroke. NOTE: There can be multiple "Mass Messaging" sub-classifications, e.g. one each for TWITTER ® and INSTAGRAM ®. TWITTER ® (Twitter is a registered trademark of Twitter, Inc.), or INSTAGRAM ®. (Instagram is a registered trademark of Instagram, LLC). |
| Gaming | Characterized by rapid arrow key (up, down, right, and/or left) presses. NOTE: There can be multiple "Gaming" sub-classifications, e.g. one each for a variety of different games or game types. |

TABLE A-continued

| Signature Pattern Classification | Description of Signature Patterns of the Signature Pattern Classification |
| --- | --- |
| Word Processing | Characterized by large amounts of characters, e.g. >M (e.g. M = 500) without key presses to change windows. |
| Specific String | An administrator user can define a specific character string to search for. Multiple character strings can be defined by an administrator user. |

Referring to Table A one classification is the classification of: Specific String. In one example a certain character string can be defined by an administrator user using an administrator user interface. An exemplary administrator user interface is illustrated by user interface 1500 as shown in FIG. 5. User interface 1500 can be displayed on a display of an administrator computer device, e.g. computer device 120 as shown in FIG. 1. Using area 1502 of user interface 1500, an administrator user can enter a character string. The character string can include e.g. a set of a combination of alphabet characters, numerical characters, symbols, and/or spaces. On entry of a certain character string entered using area 1502, manager system 110 can be configured to search for the administrator user defined character string and to classify incoming context patterns as belonging to a signature pattern classification in accordance with and associated to the certain character string. There is set forth herein in one embodiment obtaining an audio input, the audio input representing sound emanating from a key press based user interface; generating a context pattern based on the audio input; performing classification of the context pattern to classify the context pattern as belonging to a signature pattern classification, wherein the signature pattern classification specifies a user activity; and providing an output based on the performing classification, and wherein the method includes providing user interface functionality that allows an administrator user to enter a character string, registering a context pattern as a signature pattern associated to the character string, and wherein the performing classification includes matching the context pattern to the signature pattern. Thus, manager system 110 can be configured to search for any defined certain character string that may be defined by administrator user for any purpose. The defined certain character string can be searched for using one or more audio input that can be received from a computer device, or a set of computer devices that sends no information other than the audio input information. Thus, manager system 110 is able to perform classification of a certain user's activity even where no data is received via a network adapter of the certain user's computer device. Whether manager system 110 classifies activity of a certain user based solely on an audio input representing key presses of the user, or based on such audio input in combination with additional user defined data defined by the certain user and received via a network adapter of the certain user's computer device, there need not be any access or exposure to user information for classification to be performed. In one embodiment, a processed audio input can include an audio input from a certain one or more computer device that provides audio inputs representing key press based user interface sounds emanating from one or more external computer device, e.g. one or more computer device external from the certain one or more computer device providing the audio input.

Manager system 110 in one embodiment can generate a context pattern for an audio input that can include key press sequence information and/or timing information. Referring to Table A, manager system 110 can perform activity classification and signature pattern classification based on a key press sequence of a context pattern. In one embodiment, a context pattern can include key press sequence information and timing information. In embodiment, manager system 110 can perform activity classification and signature pattern classification based on timing information of a context pattern. For example, manager system 110 can use timing information as a basis for initial classification and/or to resolve conflicts between classifications. According to one example, a Web Browsing classification can be characterized by long pauses (e.g. greater than a threshold period) between key presses. Thus, manager system 110 can classify a certain context pattern matching a signature pattern with the requisite timing pattern as belonging to the Web Browsing classification or if manager system 110 is unable to resolve the certain context pattern as belonging to a Web Browsing or Mass Messaging or Specific String classification based on a key sequence, and the certain pattern is characterized by long pauses, manager system 110 can resolve the conflict in favor of the Web Browsing classification. According to another example, a Gaming classification can be characterized by short pauses (e.g. below a threshold time period) between key presses. Thus, manager system 110 can classify a certain context pattern matching a signature pattern with the requisite timing pattern as belonging to the Gaming classification or if manager system 110 is unable to resolve the certain context pattern as belonging to a Gaming or Social Media classification or Specific String based on a key sequence, and the certain pattern is characterized by short pauses, manager system 110 can resolve the conflict in favor of the Gaming classification.

Manager system 110 can classify different incoming context patterns generated from different audio inputs differently. With reference to Table A, there is set forth herein in one embodiment obtaining an audio input, the audio input representing sound emanating from a key press based user interface; generating a context pattern based on the audio input; performing classification of the context pattern to classify the context pattern as belonging to a signature pattern classification, wherein the signature pattern classification specifies a user activity; and providing an output based on the performing classification, wherein the obtaining, the generating, and the performing classification are performed for each of first through sixth audio inputs, wherein the performing classification of a context pattern associated to the first audio input results in a classification according to a Web Browsing signature pattern classification, wherein the performing classification of a context pattern associated to the second audio input results in a classification according to a Social Media signature pattern classification, wherein the performing classification of a context pattern associated to the third audio input results in a classification according to a Mass Messaging signature pattern classification, wherein the performing classification of a context pattern associated to the fourth audio input results in a classification according to a Gaming signature pattern classification, wherein the performing classification of a context pattern associated to the fifth audio input results in a classification according to a Word Processing signature pattern classification, wherein the performing classification of a context pattern associated to the sixth audio input results in a classification according to a Specific String signature pattern classification. Manager system 110 can be configured to classify any N set of audio inputs into any set of M candidate classifications, wherein N>/=1, and wherein M>/=1. The candidate classifications can include 1 to 6 of the classifications detailed in Table A and/or other classification.

Using user interface 1500 an administrator user may configure manager system 110 to register a variety of administrator defined signature patterns. An administrator user can activate area 1506 to initiate a mode in which the administrator user engages in training use of a key press based user interface during a training period and in which manager system 110 responsively provides an audio input representing the arrangement of key press sounds triggered by the administrator user's key presses. Manager system 110 can responsively generate an administrator defined context pattern from the audio input. With area 1506 active an administrator user can perform any activity that the administrator desires to register as an activity classification having an associated signature pattern that can be monitored for by manager system 110. On generation an administrator defined context pattern manager system 110 responsively can present a user interface prompt that prompts the administrator to enter labeling information that specifies an activity classification for the administrator defined context pattern. Manager system 110 can store the administrator defined context pattern with its associated administrator defined labeling information specifying a user activity classification into signature patterns area 2122 as a signature pattern defining a signature pattern classification. Manager system 110 by running of classification process 114 can match incoming context patterns to the newly stored signature pattern for performing classification of incoming context patterns in accordance with the activity and signature pattern classification defined by the administrator user. There is accordingly set forth herein a method including providing user interface functionality that allows an administrator user to perform training use of an administrator user key press based user interface during a training period, providing a certain audio input representing sound emanating from the administrator user key press based user interface during the training period, providing user interface functionality that allows the administrator user to enter labeling information that specifies an activity associated to the training use, registering a context pattern generated using the certain audio input as a signature pattern labeled with the labeling information stored in a data repository, and matching an incoming context pattern to the signature pattern.

At block 1105, manager system 110 can perform providing an output based on a result of the performing classification performed at block 1104. For performing providing an output, manager system 110 can perform providing an output based on the performing classification at block 1104. Outputs can be provided in one or more destinations, e.g. an output can be provided to computer device 130A, for receipt by computer device 130A at block 1302 and manager system 110 can provide an output at block 1106 to computer device 130Z for receipt by computer device 130Z at receive block 2302. Manager system 110 at block 1106 can perform providing an output to a hardware component 162 of network 160 for receipt by hardware component 162 at block 1621.

At block 1106 manager system 110 can perform machine learning processing. In one example, manager system 110 at block 1106 can store a result of a classification performed at block 1104 into classification history area 2123 which manager system 110 can later use e.g. for historical trends analysis. This data becomes part of the corpus that is used by the cognitive service defined by system 100. Classification history area 2123 can store rich data e.g. context derived along with the time window that context applies to (e.g. last 20 minutes, context: e.g. Web Browsing, device ABC1 confidence score: X). Performing machine learning process at block 1106 can include manager system 110 making multiple queries of data repository 112 as indicated by query receive and respond block 1123 (FIG. 4) performed by data repository 112.

In one embodiment, manager system 110 can transition into a training mode based on a failure of manager system 110 to classify a current context pattern at block 1104. In some embodiments system 100 may gain permissions to more accurately monitor and characterize a user's key press based user interface defined inputs via an opt-in method or through a human analysis.

In one embodiment, in response to running of classification process 114 failing to classify a current context pattern, manager system 110 can activate display of user interface 1600 as shown in FIG. 6. User interface 1600 can be displayed on a display of a user computer device 130A-10Z in response to a certain computer device, e.g. computer device 130A, providing an audio input and based on a context pattern according to the input not being classified, user interface 1600 can be displayed on the certain computer device 130A. User interface 1600 can prompt the user of computer device 130A to enter information on the activity generating the current audio input. Computer device 130A can then send the description of the activity (defined by the user of computer device 130A using user interface 1600) to manager system 110. Where multiple similar audio inputs are received, manager system 110 can activate display of user interface 1600 on the multiple computer devices providing the multiple audio inputs. Users of the different computer devices can send descriptions of their respective activities using area 1602. Manager system 110 can use natural language processing (NLP) to identify labeling specifiers to classify the received activity descriptions into a limited number of classifications that specify descriptions of user activity. Manager system 110 can process context patterns of commonly classified activities that are commonly classified as common activities using user input descriptions. Manager system 110 can identify one or more signature pattern based on the classification information and can register one or more new signature pattern classification as shown in Table A, based on the processing.

At block 1107, manager system 110 can return to block 1101 to receive additional one or more audio input from one or more computer devices of computer devices 130A-130Z.

Examples 1 through 5 illustrate various use cases for system 100. In one embodiment, as illustrated by Example 1, system 100 can be used in a law enforcement application and providing an output at block 1105 (FIG. 4) can include outputting a notification to an external system 140 provided by a law enforcement system.

EXAMPLE 1

A law enforcement officer learns about a planned criminal activity and they know the operation is code named "night eagle." Manager system 110 can be operated and maintained by the law enforcement agency and an administrator user can use user interface 1500 to register "night eagle" as a Specific String signature pattern searched for by manager system 110. An alert is issued to all computer devices 130A-130Z having users who have opted in to collect key press based user interface acoustic samples from surrounding areas. Manager system 110 can classify incoming context patterns determined to match one or more signature pattern stored for the administrator user defined Specific String classification. A signature pattern for the classification can specify key press sequence information (e.g. including character string information) as well as timing information e.g. including that there may be 30% more time between the "N" and the "i" (because those are typed with the same hand) than the "g" and "h" which are typed with separate hands and usually the cadence shows less time between those letters. In that the space key often has a unique sound a stored signature pattern for the described Specific String can be provided in one embodiment as follows:

N [10] i [8] g [6] h[12] t[12] [space] e[20] a [15] g [8] 1 [11] e

N [~] i [−2] g [−4] h [+2] t [+2] [space] e [+10] a [+5] g [−2] 1 [+1] e with the numbers in brackets being some unit of time between strokes or maybe a relative time between each letter. Key sequence information of a stored signature pattern can define e.g. a name, a code name, location coordinates, a specific time expressed in one or more time format and the like. Manager system 110 can match incoming context patterns generated using audio inputs to the stored signature pattern using e.g. key sequence information including character string information of the incoming context patterns and/or timing information of the incoming context patterns. Manager system 110 can use timing information for establishing a classification and/or for resolving conflicts between prospective classifications. Based on e.g. manager system 110 classifying a threshold number of incoming context pattern as belonging to the defined Specific String signature pattern classification, manager system 110 can provide one or more output e.g. including a message output to external system 140 to dispatch law enforcement personnel and vehicles, a command output to initiate location services processes to determine locations of computer devices providing audio inputs having associated context patterns matched to the signature pattern, a machine process control to activate traffic control signals and/or road blockages based on a result return from the location services processes.

End of Example 1

In one embodiment, as illustrated by Example 2, system 100 can be used in a network configuration application and providing an output at block 1105 (FIG. 4) can include providing an output for configuring a hardware component of a network.

EXAMPLE 2

In one embodiment, manager system 110 can run classification process 114 for determining a configuration of network 160, e.g. for use in configuring a hardware component 162 of network 160 such as a router. In one embodiment, classification process 114 can be run to process an audio input provided by a single computer device, e.g. computer device 130A, computer device 130A can be disposed in the environment of a local area network (LAN), which is in communication with manager system 110 via hardware component 162 provided by a router. Manager system 110 can run classification process 114 to classify activity of a user who uses a computer device 130A, via a connection provided by hardware component 162 provided by a router. Manager system 110 can run classification process 114 to classify an activity of the user and can adjust a configuration of hardware component 162 provided by a router based on the classification. Routers can include alternate port configurations that can be optimized based on traffic through the router. Manager system 110, in one embodiment can be operative to configure hardware component 162 based on a determined activity of a user using computer device 130A, e.g. can configure hardware component 162 to include a first port configuration based on a first activity being detected e.g. Gaming and a second port configuration e.g. Web Browsing based on a detected activity of computer device 130A.

End of Example 2

In one embodiment, as illustrated by Example 3, system 100 can be used in a network configuration application and providing an output at block 1105 (FIG. 4) can include providing an output for configuring a hardware component of a network.

EXAMPLE 3

Manager system 110 can be provided to configure a hardware component 162 provided in the described embodiment by a router based on activities detected by a plurality of user computer devices 130A-130Z. There can be disposed a plurality of computer devices, e.g. computer devices 130A-130Z in a certain environment, e.g. a local environment or a wide area environment. In one example, computer devices 130A-130Z can be disposed in an Internet cafe that is in communication with manager system 110 via a local area network (LAN). Traffic between computer devices 130A-130Z and manager system 110 can be provided by a hardware component 162, provided by a router. Manager system 110 can be operative to configure hardware component 162 provided by a router based on activities of users detected using computer devices 130A-130Z. Computer devices 130A-130Z can send audio inputs received and processed by manager system 110 by running of context pattern generating process 113 and classification process 114. Manager system 110 can be iteratively performing classification process 114 and can be iteratively generating a prioritized list that specifies activities being performed with computer devices in the described environment. For example, at time 1, manager system 110 can determine the following priority of activities within an environment:

1. Gaming, 2. Social Media, 3. Mass Messaging.

At a later time, time 2, manager system 110 can determine the following priority of activities within an environment:

1. Mass Messaging, 2. Web Browsing 3. Social Media.

Manager system 110 based on results provided by classification process 114 can iteratively configure hardware component 162 provided by a router based on the prioritized list generated by manager system 110. At time 1, manager system 110 can be configured to control hardware component 162 provided by a router to have a first port configuration based on the priority of activities determined at time 1. At time 2, manager system 110 can be configured to control hardware component 162 provided by a router to have a second port configuration based on the determined activities of users within the environment at time 2.

End of Example 3

In one embodiment, as illustrated by Example 4, system 100 can be used in a software configuration application and providing an output at block 1105 (FIG. 4) can include providing an output for changing functionality of a computer device.

EXAMPLE 4

Manager system 110 can be provided to receive and process audio inputs received by a single computer device, e.g. 130A. A user of computer device 130A can be performing an activity and a classification for that activity can be determined by manager system 110 by running of classification process 114. Computer device 130A can be sending to manager system 110 for processing, audio input information representing sound emanations of a key press based user interface including a keyboard of computer device 130A. Running context pattern generating process 113 and classification process 114, manager system 110 can determine a current activity of the user. Responsively to a classification performed by running of classification process 114, manager system 110 can present for installation at computer device 130A specific software downloaded from software area 2124 of data repository 112 in a manner that optimizes performance of computer device 130A depending on a current activity being performed by a user using computer device 130A. For example, based on running of classification process 114 determining that a current activity classification is Word Processing manager system 110 can responsively initiate downloading from software area 2124 for installation on computer device 130A software for optimization of word processing in accordance with the determined Word Processing classification. Such software can include, e.g. software for providing additional fonts or additional word processing functions. Based on running of classification process 114 determining that a current activity classification is Gaming manager system 110 can responsively initiate downloading from software area 2124 for installation on computer device 130A software for optimization of gaming in accordance with the determined Gaming classification, e.g. software to implement additional gaming functionalities e.g. using additional keyboard inputs as game controls.

End of Example 4

In one embodiment, as illustrated by Example 5, system 100 can be used in a user interface application and providing an output at block 1105 (FIG. 4) can include providing an output for providing real time feedback to a user of a computer device for enhanced user interface functionality.

EXAMPLE 5

In this example, computer device 130A is a computer device used by a presenter in a live auditorium and is configured by running of classification process 114 to provide real time feedback to the presenter using computer device 130A as to the attention level of the audience. Computer device 130A can be displaying, e.g. slides of a current slide presentation which are also separately projected in the auditorium and can also display e.g. text messages that are sent for display on a display of computer device 130A by manager system 110, in response to result of classification process 114. In the described scenario, computer device 130A can be a computer device used by a presenter whereas computer devices 130B-130Z are additional computer devices in the auditorium that are capable of providing an audio input. Computer devices 130B-130Z provide audio inputs for processing by manager system 110 using context pattern generating process 113 and classification process 114. In the described scenario, classification process 114 can be provided to determine activities of the users of computer devices 130B-130Z. More specifically, manager system 110 running classification process 114 can be configured to determine whether users of computer devices 130B-130Z who are attending the presentation are being attentive to the presentation being presented by the presenter who is using computer device 130A. For example, the presentation being presented using computer device 130A can be displaying website domains including or specified with strings of characters which the audience is requested to browse to during the presentation by the presenter. Computer devices 130B-130Z sending audio inputs to manager system for processing using context pattern generating process 114 and classification process 114 can be used to determine whether audience members are actually browsing to the domain specified by the presentation being run by computer device 130A. Monitoring key press based user interface sounds including keyboard sounds and using context pattern generating process 113 and classification process 114, manager system 110 can monitor sounds produced by keyboards at the auditorium to determine whether audience members and users of computer devices 130B-130Z are actually browsing to domains to which they are instructed, or on the other hand whether they are browsing differently than instructed, e.g. to domains other than specified domains specified during a presentation or engaging in activities of classifications other than Web Browsing. For providing an output at block 1106, in accordance with such a scenario, manager system 110 can send a text based message to computer device 130A based on result of classification process 114, so that the presenter of a presentation using computer device 130A is given live, real time feedback as to the audience's attention to the presentation. For example, manager system 110 can send text based messages for display on the display of computer device 130A, e.g. "MANY AUDIENCE MEMBERS HAVE BROWSED TO THE SPECIFIED DOMAIN" based on manager device 110 determining that more than a threshold number of audience members have browsed to the instructed domain, or alternatively "VERY FEW MEMBERS HAVE BROWSED TO THE SPECIFIED DOMAIN" based on manager device 110 determining that less than a threshold number of audience members have browsed to the instructed domain. Based on the prompting message sent by manager system 110, the presenter can thus decide to alter the course of the presentation, e.g. if there is little response to the instructed domain the presenter can go back to a prior part in the presentation when the domain was specified and repeat the request to browse to the specified domain.

End of Example 5

Certain embodiments herein may offer various technical computing advantages, involving computing advantages to address problems arising in the realm of computer networks such as determining current activities of users of computer devices 130A-130Z. Embodiments herein provide for classification of computer user activities without access to user identification and without exposure of user identification. Embodiments herein receive audio inputs from a variety of sources and transform such inputs into context patterns that can facilitate further processes. Embodiments herein process audio inputs for classification of user activities. Outputs can be provided based on the classifications to drive various automated processes e.g. network hardware component control, controls to initiate downloading of software, user interface controls, controls to transmit notifications. Machine learning processes can be implemented. For example in one embodiment failure of a classification can trigger registration of an unclassifiable pattern as a new signature pattern for storage and comparison to incoming context patterns.

Figure 7:
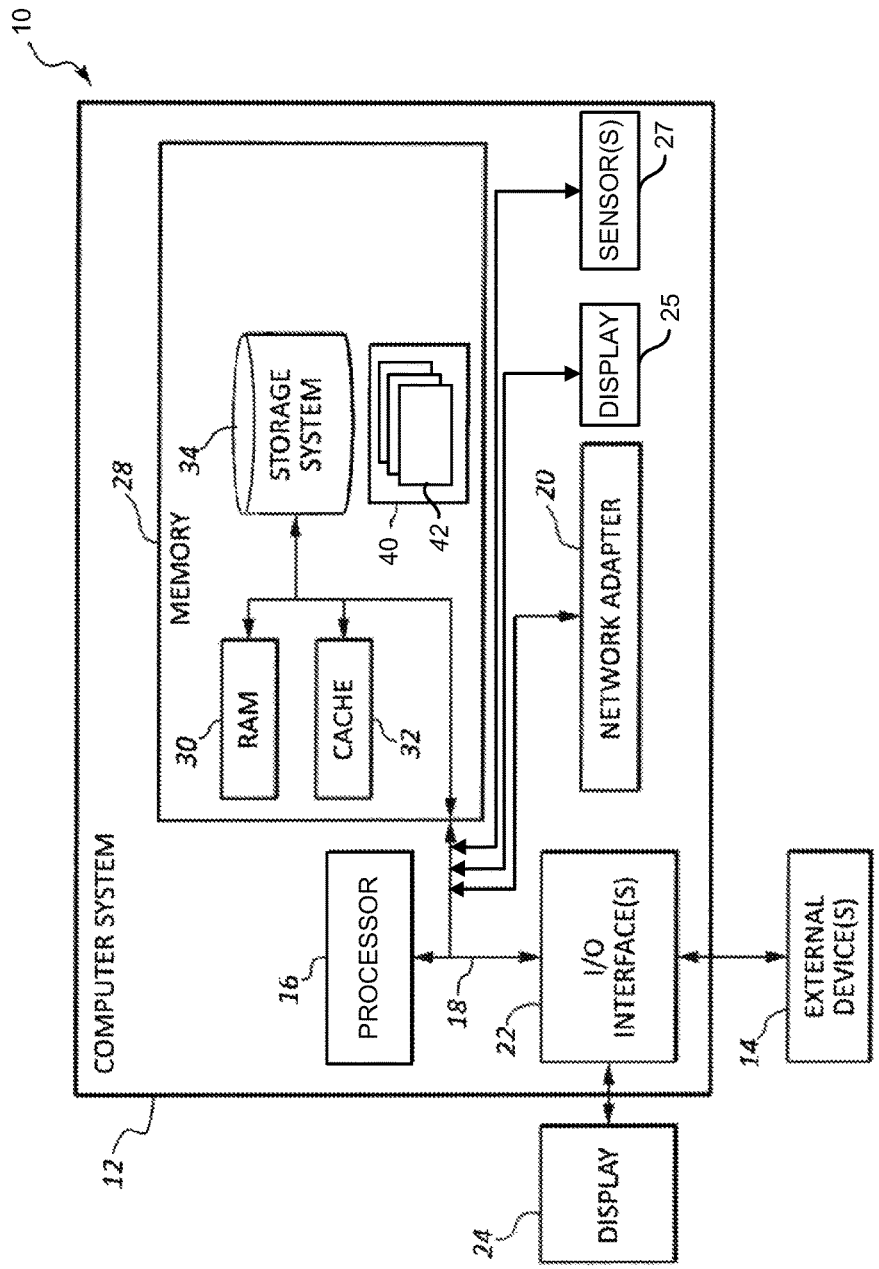
FIG. 7 depicts a computing node according to one embodiment.
Figure 8:
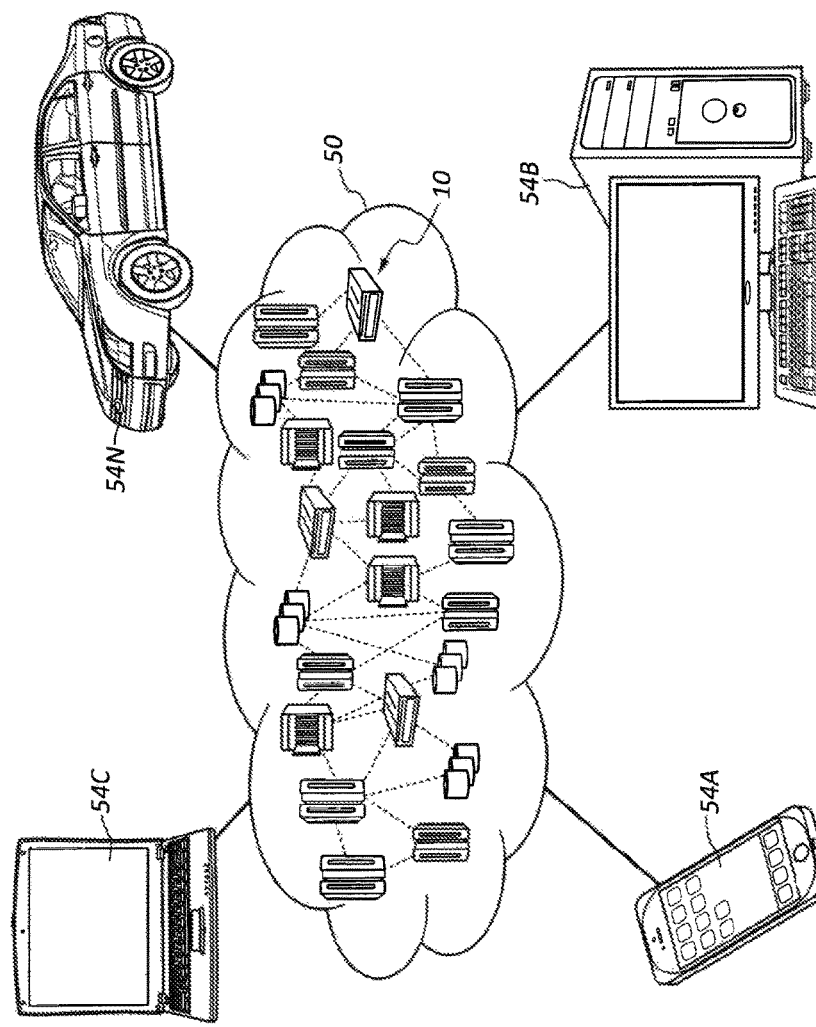
FIG. 8 depicts a cloud computing environment according to one embodiment.
Figure 9:
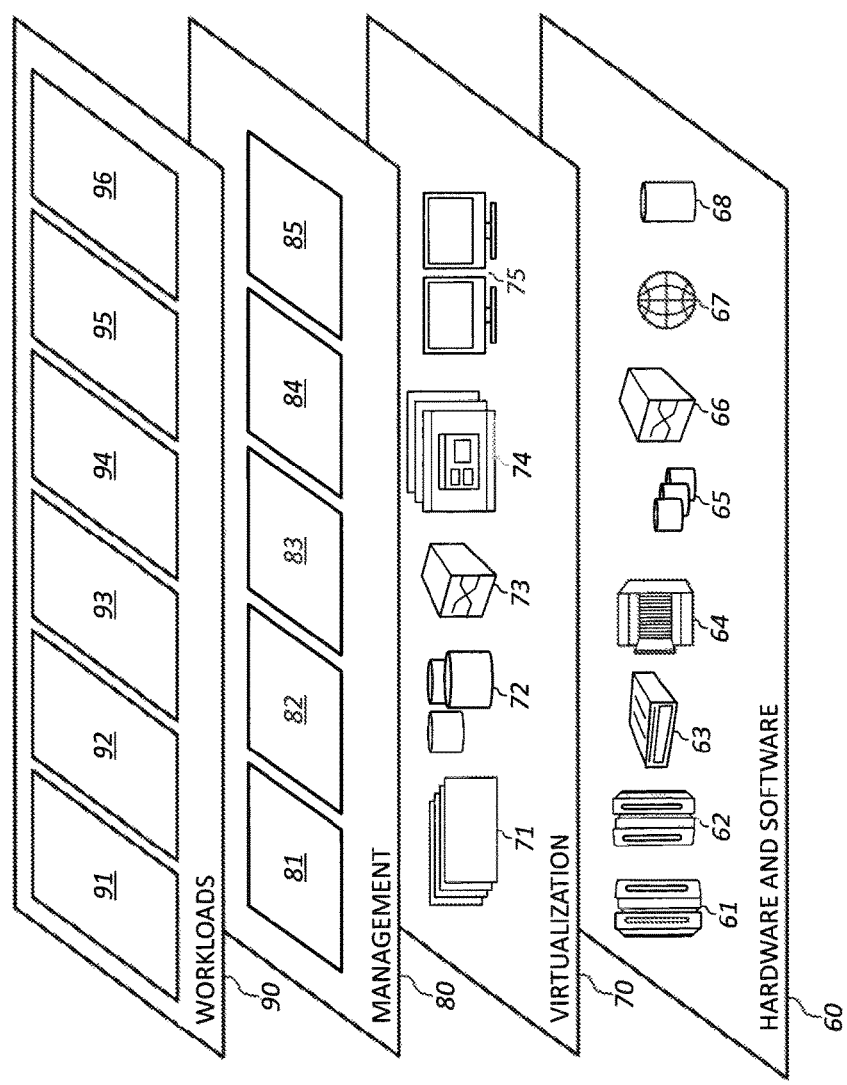
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, for performing functions described with reference to method 300 of FIG. 3, and the functions described with reference to manager system 110 as set forth in the flowchart of FIG. 4. In one embodiment, one or more user computer device 130A-130Z can include one or more computing node 10 and can include one or more program 40 for performing functions described with reference to one or more user computer device 130A-130Z as set forth in the flowchart of FIG. 4.

Computer system 12 may also communicate with one or more external devices 14 such as a keyboard, a pointer controller e.g. a mouse, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Such audio input device can be used to provide audio inputs representing sounds emanating from a key press based user interface of computer device 12 and/or a computer device external to computer device 12. Computer system 12 can include one or more network adapter 20. In one embodiment a key press based user interface can include a keyboard and a pointer controller. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for activity classification based on processing audio inputs as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining an audio input, the audio input representing sound emanating from a key press based user interface;
generating a context pattern based on the audio input;
performing classification of the context pattern to classify the context pattern as belonging to a signature pattern classification, wherein the signature pattern classification specifies a user activity; and
providing an output based on the performing classification, wherein the performing classification results in classification failure, wherein the method includes prompting a user to enter activity information in response to the classification failure, and wherein the prompting includes providing user interface functionality that prompts the user to enter activity specifying information that specifies an activity engaged in by the user resulting in the generating of the context pattern, and wherein the method includes, using data received from the user in response to the prompting, registering the context pattern as a new signature pattern for comparison to subsequent context patterns.

2. The method of claim 1, wherein the signature pattern classification is a classification selected from the group consisting of Web Browsing, Social Media, Mass Messaging, Gaming, Word Processing, and Specific String.

3. The method of claim 1, wherein the signature pattern classification is a classification defined by a certain character string.

4. The method of claim 1, wherein the method includes providing user interface functionality that allows an administrator user to enter a character string, registering a first context pattern as a first signature pattern associated to the character string, and wherein the performing classification includes matching an incoming context pattern to the first signature pattern.

5. The method of claim 1, wherein the providing an output includes providing a notification to an external system.

6. The method of claim 1, wherein the providing an output includes providing an output to configure a network hardware component.

7. The method of claim 1, wherein the providing an output includes providing an output to initiate installation of software on a computer device.

8. The method of claim 1, wherein the context pattern includes key press sequence information and timing information.

9. The method of claim 1, wherein the obtaining includes obtaining the audio input from a computer device, wherein responsively to the performing classification failing to classify the context pattern, there is provided a prompt on the computer device prompting a user of the computer device to enter labeling information that specifies an activity associated with the context pattern.

10. The method of claim 1, wherein the method includes providing functionality that allows an administrator user to perform training use of an administrator user key press based user interface during a training period, providing a certain audio input representing sound emanating from the administrator user key press based user interface during the training period, providing functionality that allows the administrator user to enter labeling information that specifies an activity associated to the training use, registering a first context pattern generated using the certain audio input as a first signature pattern labeled with the labeling information stored in a data repository, and matching an incoming context pattern to the first signature pattern.

11. The method of claim 1, wherein the signature pattern classification is a Web Browsing classification.

12. The method of claim 1, wherein the signature pattern classification is a Gaming classification.

13. The method of claim 1, wherein the signature pattern classification is a Word Processing classification.

* * * * *